United States Patent [19]

Einolf, Jr. et al.

[11] 4,395,710

[45] Jul. 26, 1983

[54] BUS ACCESS CIRCUIT FOR HIGH SPEED DIGITAL DATA COMMUNICATION

[75] Inventors: Charles W. Einolf, Jr.; Andras I. Szabo, both of Murrysville; Albert W. Crew, Pittsburgh, all of Pa.

[73] Assignee: Westinghouse Electric Corp., Pittsburgh, Pa.

[21] Appl. No.: 210,700

[22] Filed: Nov. 26, 1980

[51] Int. Cl.³ .......................... H04Q 9/00; H04J 3/00
[52] U.S. Cl. .................................. 340/825.5; 370/94; 370/85
[58] Field of Search ............ 340/825.5, 825.51, 168 B, 340/825.61; 178/2; 370/85, 91, 94

[56] References Cited

U.S. PATENT DOCUMENTS

| 4,063,220 | 12/1977 | Metcalfe et al. | |
| 4,096,355 | 6/1978 | Rothauser et al. | 370/94 |
| 4,161,634 | 7/1979 | Bellisio | 340/168 B |
| 4,177,450 | 12/1979 | Sarrand | 340/825.5 |
| 4,199,661 | 4/1980 | White et al. | 370/91 |
| 4,232,294 | 11/1980 | Burke et al. | 340/825.5 |
| 4,281,380 | 7/1981 | DeMesa et al. | 340/825.5 |

OTHER PUBLICATIONS

Network Systems Corporation, Publication Number A01–0000–02, Jan., 1978.

Primary Examiner—Donald J. Yusko
Attorney, Agent, or Firm—W. E. Zitelli

[57] ABSTRACT

A serial data communications network in which a plurality of stations communicate among one another in an orderly and collision-free manner on a single serial bus. Each station incorporates an improved bus access circuit to operate in cooperation with the bus access circuit of every other station in the network. The resulting effect as to each station is the assignment of a unique, recurring time window during which the station may initiate a transmission on the serial bus exclusive of all other stations.

6 Claims, 9 Drawing Figures

BUS ACCESS CIRCUIT FOR HIGH SPEED DIGITAL DATA COMMUNICATION

CROSS REFERENCE TO RELATED APPLICATIONS

This application is related to the following application filed concurrently herewith:

Ser. No. 234,060; filed Feb. 12, 1981; entitled "Improved Data Highway Access Control System" by J. F. Sutherland, D. F. Ferguson and M. Kezunovic and assigned to Westinghouse Electric Corporation.

BACKGROUND OF THE INVENTION

The present invention relates to data communication systems, and more particularly to a circuit permitting a plurality of processor units in a communications network to communicate on a serial bus.

In one common type of communications network a number of processor units are connected to a single serial data communications bus which comprises any one or a plurality of transmitting media, such as coaxial cable, optical fiber, or others. The processor units connected to the serial bus will hereinafter be designated as stations.

Any particular station may comprise a variety of hardware elements and may be dedicated to various purposes. For example, a single network may comprise stations dedicated to a specific control or monitor task, stations dedicated to data accumulation or analysis, and stations dedicated to peripheral equipment for user input and output. Each station has in common a transmitter-receiver unit, which enables the station to communicate with any of the other stations connected to the serial bus.

An important characteristic of this typical communication network is that no dedicated station is provided for controlling the serial bus communications. As a result, communications in this network are not crippled by the failure of a single station. There remains, however, the problem of arbitrating orderly access to the single serial bus among the plurality of connected stations.

Typical of the known prior art is U.S. Pat. No. 4,063,220. In this scheme, transmissions are removed from the serial bus by a receiver and passed to the receiver logic, where the message is decoded to ascertain the intended destination. If the transmission was directed to the receiving station, error checks are performed and the message is passed to the station using device through the input buffer.

Messages originating from the station using device are passed through the output buffer to the transmitter logic. Here, the message is coded for transmission through the transmitter. The combination of the transmitter logic and the collision detection logic performs the service of defining when a transmission may be made. According to this prior art scheme, a station may issue a transmission after determining that the serial bus has been silent for a given period of time. If, after the initial transmission, no collision between transmissions of two or more stations are detected, the transmitting station acquires access to the bus.

If collisions are detected after the initial transmission, the transmitting station backs off and waits a period of time calculated to avoid further collisions before attempting to transmit again. The station considers the number of previous collisions in calculating the waiting period before each attempted transmission. The process continues until a collision-free transmission is attained.

This prior art scheme works quite well where the frequency of transmissions on the serial bus is low. Occasional collisions do not distort network communications. In networks where the density of transmissions is large due to the length of the transmissions or to the large number of stations in the network, the frequency of collisions between competing transmissions is much greater. The time required for a station in such high density networks to obtain access to the bus is unpredictable and often quite lengthy.

An improved prior art scheme is revealed by Network Systems Corporation (hereinafter NSC) Publication No. A01-0000-02. In this arrangement, each station monitors the serial bus for silence. After a predetermined, unique delay during which the serial bus is determined to be silent, each station is given a time slot during which to initiate a transmission. If no station initiates a transmission during its time slot, the total delay expires and the system reverts to the prior art scheme of transmitting when no transmission is detected on the serial bus. If a collision thereafter occurs, the above-described mechanism for allocation to each station of a unique time slot is activated and each station transmits upon appearance of its time slot.

The NSC arrangement also includes a wait flip-flop mechanism for preventing more than one transmission by any single station until all stations have been given an opportunity to transmit; i.e., until the total delay expires. This mechanism may be active or inactive for any station in the network.

The NSC scheme alleviates many of the problems associated with the collision detection system of U.S. Pat. No. 4,063,220. There remains, however, some situations where the NSC scheme does not yield orderly and collision-free access to the serial bus. One such situation arises in a network comprising several high-priority stations which are very active as well as many other lower priority stations which are less active. With the wait flip-flop mechanism of all stations active, each station in the network would be permitted a single transmission until all stations have had an opportunity to transmit. Upon expiration of the total delay, the orderly allocation of transmissions ceases and any or all stations may issue a transmission. The result is inevitably a collision of transmissions by two or more of the active stations which were prevented from subsequent transmission by their wait flip-flop mechanisms.

Correction of this situation is needlessly time-consuming, especially in a system such as that of NSC where each transmission also results in a pause at all stations so that the receiving station may respond immediately to the transmitting station. The collision problem may be solved by rendering inactive the wait flip-flop mechanism of each high priority station, but such would permit domination of the serial bus by the high priority stations to the exclusion of all other stations.

An additional problem presented by the prior art is a lack of flexibility in the allocation of priority. The priority of a station operating under the NSC scheme is controlled primarily by the state of its wait flip-flop mechanism and secondarily by the position of its time slot relative to the time slots of other stations. A wait flip-flop mechanism in the active state yields a station with a high priority level. This station is subject only to domination by a similar station with a prior time slot.

Various combinations of the two factors can yield a variety of systems, but prediction of the average response time for a given station is impossible without accurate knowledge of the frequency of transmission by each station. Such a calculation becomes unmanageable in a network comprising a relatively large number of stations. In short, the prior art schemes render difficult the task of arranging stations in a plurality of distinct priority levels.

Hence, it would be advantageous to develop a bus access arrangement providing for orderly and collision-free access by a plurality of stations to a single serial communications bus. It would further be advantageous if this arrangement did not compromise access time in the achievement of orderly and collision-free access. Finally, it would be advantageous if this arrangement permitted flexibility in the ordering of priority of stations in the network.

SUMMARY OF THE INVENTION

The problems which arise in use of the prior art schemes are overcome in the invention by incorporating within the transmitter-receiver unit of each station in the network an improved means for providing access to a serial bus. Coordinated use of the bus access means in each station in the network results in provision for each station of a unique time window during which it may initiate transmission on the serial bus. If access is not claimed within this time window, the station is prevented from issuing a transmission until its time window reappears during the next round of bus arbitration.

DESCRIPTION OF THE PREFERRED EMBODIMENT

Figure 1:
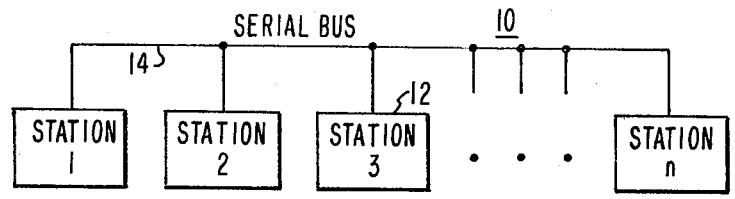
FIG. 1 is a block diagram showing a multi-station communications network in which the invention is embodied.

FIG. 1 shows a block diagram of a communications network 10 which embodies the invention. Each station 12 of the network 10 is connected to a single serial bus 14. The invention is directed to coordinating the access of each station 12 to the serial bus 14 in such a way as to avoid transmission collisions and assure transmission within a reasonable period of time.

Figure 2:
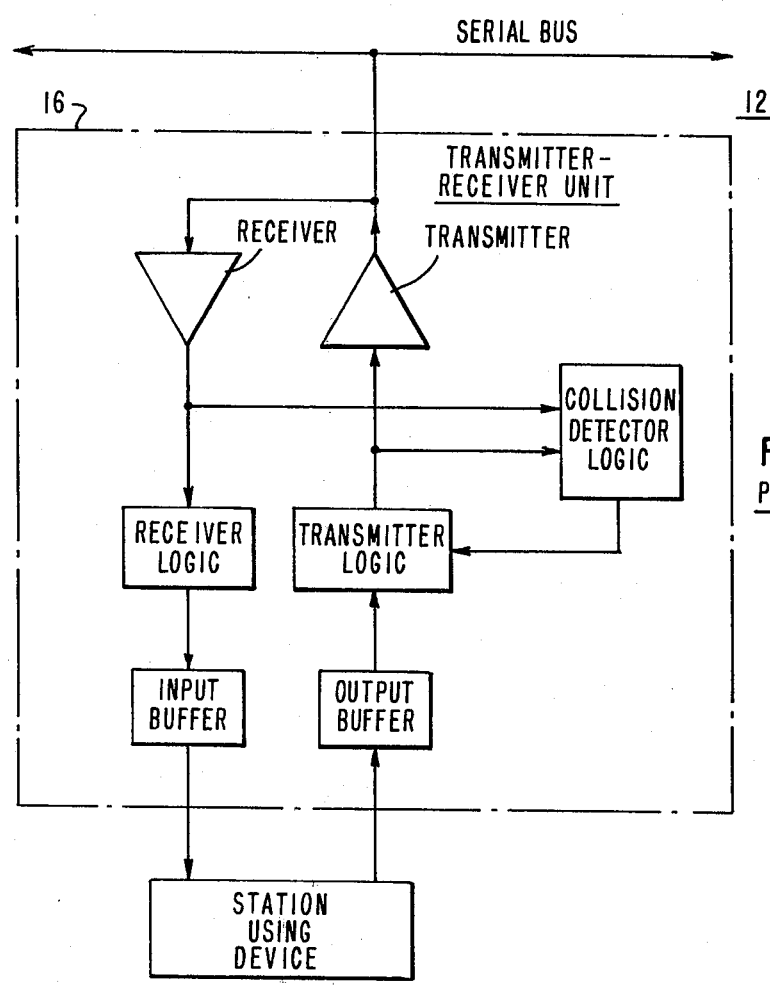
FIG. 2 is a block diagram showing a transmitter-receiver unit in a prior art station.
Figure 3:
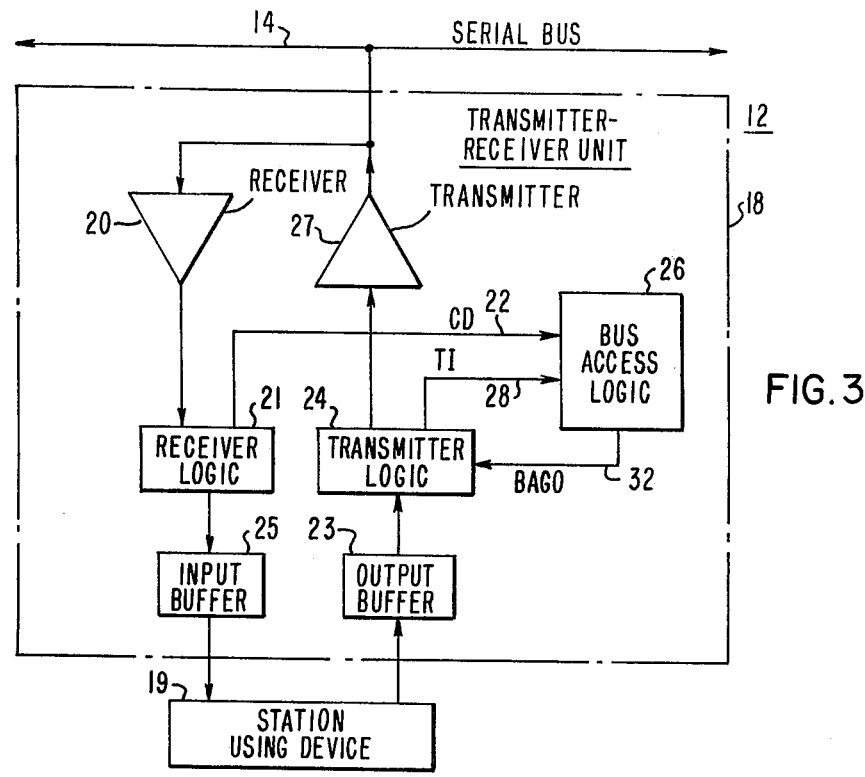
FIG. 3 is a block diagram showing a transmitter-receiver unit in a station incorporating improved bus access logic.

Each station 12 comprises a transmitter-receiver unit and a using device, which may comprise any of a variety of hardware elements. FIG. 2 shows a block diagram of a transmitter-receiver unit 16 in one of the stations 12 of FIG. 1 for the prior art. FIG. 3 shows a block diagram of a transmitter-receiver unit 18 in one of the stations 12 of FIG. 1 for the invention.

In accordance with the principles of the invention, each station 12 is provided an improved bus access circuit 26 which operates in cooperation with the bus access circuit 26 of every other station 12 to allocate access to the serial bus 14. The transmitter-receiver unit 18 acts as an interface between a using device 19 and the serial bus 14. Transmissions are intercepted from the serial bus 14 by a receiver 20 and passed to a receiver logic 21, where a message is decoded to ascertain its destination. If the message was intended for the receiving station 12, it is passed to the using device 19 through an input buffer 25.

Messages originating within the station using device 19 are passed through an output buffer 23 to a transmitter logic 24, where the messages are coded for transmission on the serial bus 14. When signalled by the bus access logic 26 to proceed, the transmitter logic 24 releases the message to a transmitter 27 for transmission on the serial bus 14.

The improved bus access logic 26 works in cooperation with the bus access logic 26 of every other station 12 in the network 10 to define a unique time window during which the station 12 may initiate a transmission on the bus. Each station 12 is prevented from initiating a transmission except during its time window, which recurs periodically. The cyclical nature of this time window provides improved system coordination by allocating orderly and collision-free access and permits the assignment of multiple levels of access priority.

The bus access logic 26 receives as an input 22 a carrier detect (CD) signal from the receiver logic 21 indicating that a transmission has been detected on the serial bus 14. The bus access logic 26 also receives as an input 28 a transmit indicate (TI) signal from the transmitter logic 24 indicating that a transmission is being issued on the serial bus 14. The bus access logic 26 provides as an output 32 a bus access go (BAGO) signal to the transmitter logic indicating that a transmission may be initiated.

Figure 4:
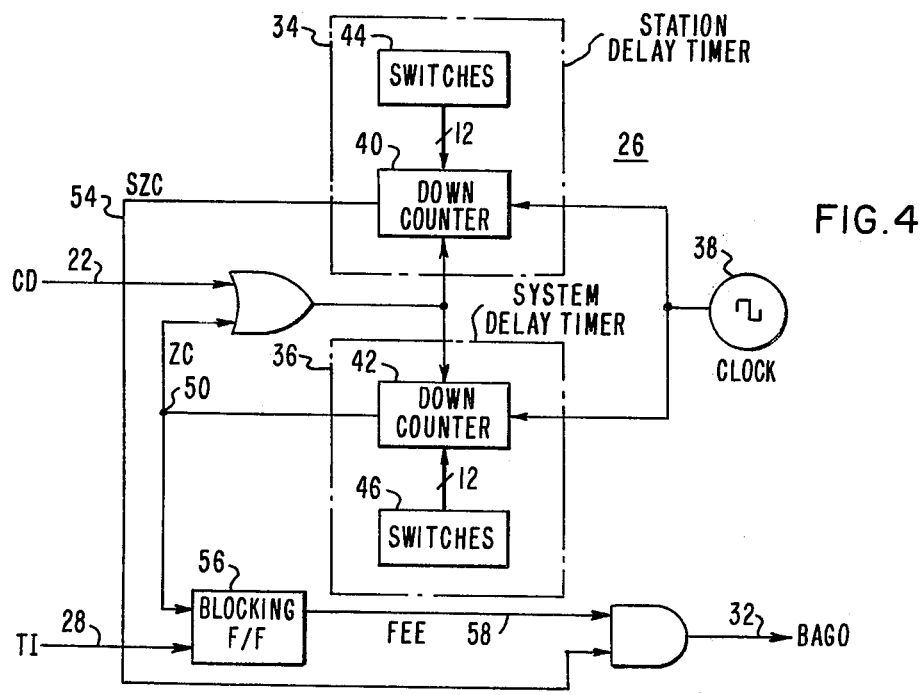
FIG. 4 is a block diagram showing the operation of the bus access logic.

FIG. 4 shows a block diagram of the bus access logic 26. The logic 26 comprises two timers 34, 36, both of which are driven by the same bus access clock 38. Each timer 34, 36 comprises a down counter 40, 42 which is preloaded from a switch set 44, 46. One timer is designated the station delay timer 34. The other timer is designated the system delay timer 36. The two down counters 40, 42 are preloaded simultaneously when the CD input 22 indicates the presence of a transmission on the serial bus, or when the system delay timer 36 asserts the zero count (ZC) signal 50 indicating expiration of the system delay timer.

The bus access go (BAGO) signal 32 corresponds to the leading edge of a single clock pulse which indicates to the transmitter logic within the transmitter-receiver unit (see FIG. 3) of the station that a transmission may be initiated. It is assumed that the transmitter logic will not attempt to initiate a transmission without assertion of the BAGO signal 32. It is also assumed that if the transmitter logic is not prepared to issue a transmission at the time the BAGO signal 32 is asserted, then the transmitter logic will withhold transmission until the next time the BAGO signal 32 is asserted. These assumptions are justified in light of the structure of the prior art.

The bus access logic depicted in FIG. 4 effectively allocates to each station incorporating this logic a unique time window in which to claim access to the serial bus. The occurrence of this time window is governed by the station delay timer 34 and the system delay timer 36. When the CD signal 22 indicates that the serial bus is silent, the station delay down counter 40 begins to count down from its preloaded state.

The magnitude of the preloaded state is unique for the station delay down counter 40 of each station in the network. The expiration of the station delay timer 34, marked by assertion of a zero count (SZC) signal 54, defines the time window for that station. The magnitude of the delay created by the station delay timer 34 is chosen so that each station in the network is allocated a unique point in time at which it may initiate a transmission. Upon initiation of a transmission by any station during its time window, the station delay timer 34 and the system delay timer 36 of each station are reset when the CD signal 22 of that station is asserted.

The system delay timer 36 defines the period of time required for each station to detect that the station delay timer 34 of all stations in the network has expired without initiation of a transmission. Hence, the ZC signal 50, indicating the zero count state of the system delay down counter 42, resets the station delay timer 34 and the system delay timer 36, and the process of arbitrating bus access begins again.

A communications network embodying the invention as disclosed thus far is a highly prioritized system. A station with a short station delay may dominate the bus, preventing stations with a longer station delay from transmitting within a reasonable period of time. In systems where such a prioritized scheme is undesirable, the system may be rendered fully democratic by the introduction of a blocking flip-flop. This device will allow each station to transmit only once before every other station is given an opportunity to transmit. The blocking flip-flop 56 serves to prevent assertion of the BAGO signal 32 more than one time during any complete cycle of the wait delay timer 36. When the ZC signal 50 is asserted, then the flip-flop enable (FFE) signal 58 is asserted, enabling the assertion of the BAGO signal 32. When the transmit indicate (TI) signal 28 is asserted, the blocking flip-flop 56 resets the FFE signal 58, disabling the assertion of the BAGO signal 52. This device allows each station in the network the opportunity to transmit within a reasonable time by preventing a station with a short station delay from dominating the serial bus.

Figure 5:
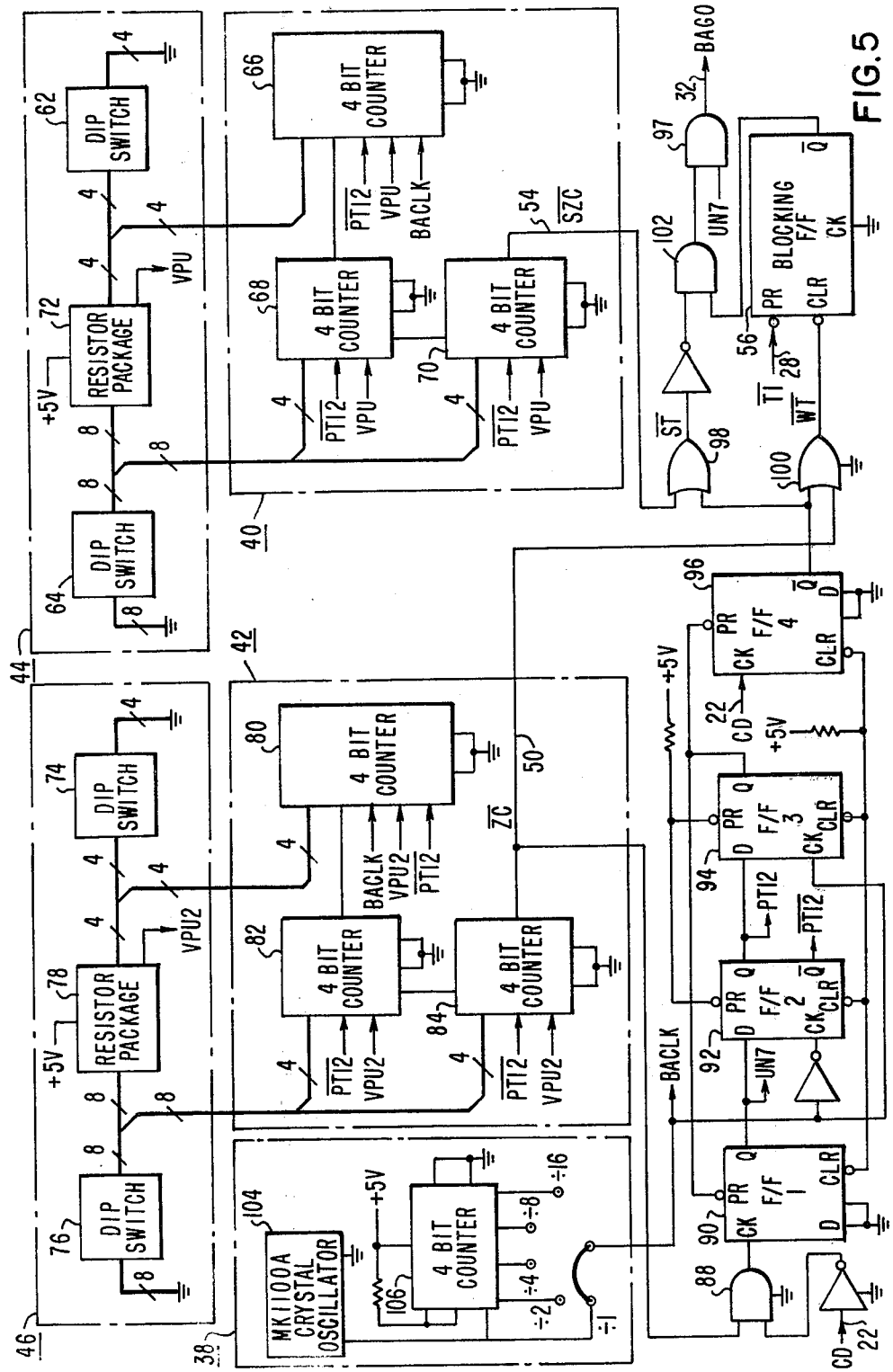
FIG. 5 is a schematic diagram showing the detail of the bus access logic.

FIG. 5 is a schematic diagram showing the detail of the bus access logic. All devices in this circuit operate at transistor-transistor logic levels. The station delay switch set 44 comprises a pair of dual in-line package (DIP) switches 62, 64 for determining the logic level at the input of the preload lines on the three counters 66, 68, 70 comprising the station delay down counter 40. When a switch in one of the DIP switches 62, 64 is open, the preload input is pulled up to five volts DC through the resistor package 72. When a switch is closed, the corresponding preload input is grounded. The three counters 66, 68, 70 are daisy-chained to produce a twelve-bit down counter 40 with a zero count (SZC) output signal 54 which is asserted when low.

The system delay switch set 46 is similarly comprised of two DIP switches 74, 76 and a resistor package 78. The system delay down counter 42 comprises three counters 80, 82, 84 which are daisy-chained to produce a twelve-bit down counter 42 with a zero count (ZC) output signal 50 which is asserted when low.

The sequence which results in the preloading of the station delay down counter 40 and the system delay down counter 42 begins with either the assertion of the ZC signal 50, which indicates expiration of the system delay timer, or the reset of the carrier detect (CD) signal 22, which indicates the end of a transmission on the serial bus. The occurrence of one of these two events results in a low-to-high signal transition at the output of an AND gate 88, which is connected to the first 90 of a series of four edge-triggered D flip-flops. The output of the first flip-flop 90 is thereby clocked low, inhibiting the assertion of the BAGO signal 32 at an AND gate 96. This low state is clocked through the second flip-flop 92 by the bus access clock 38, preloading the station delay counter 40 and the system delay counter 42. When the low state is finally clocked through the third flip-flop 94, the output of the first flip-flop 90 returns to the high state. This high state is then successively clocked through the second 92 and third 94 flip-flops by the bus access clock 38. The three flip-flops 90, 92, 94 thereafter remain latched with their outputs at the high state until the above sequence is again triggered by expiration of the system delay timer or loss of a transmission signal on the serial bus.

The fourth flip-flop 96 is used to disable the output of the two timers 34, 36 during bus transmissions by latching the inverted output of the flip-flop 96 in the high state on assertion of the CD signal 22. This prevents the output of two OR gates 98, 100 from assuming the low state on assertion of the SZC signal 54 or the ZC signal 50. The two timers 34, 36 are again enabled when a high state on the output of the third flip-flop 94 forces the inverted output of the fourth flip-flop 96 to the low state. The bus access clock 38 comprises a crystal oscillator 104 and a four-bit counter 106 which provides optional subdivisions of the primary crystal clock frequency.

The blocking flip-flop 56 is used to disable the BAGO signal 32 upon indication by the TI signal 28 that the station is issuing a transmission. This is accomplished by pulling the inverted output of a D flip-flop 56 to the low state on assertion of the TI signal 60. This action disables the BAGO signal 32 at an AND gate 102. The BAGO signal 32 is again enabled when the system delay timer 36 expires, asserting the SZC signal 54, which forces the inverted output of the blocking flip-flop 56 to the high state.

Figure 6:
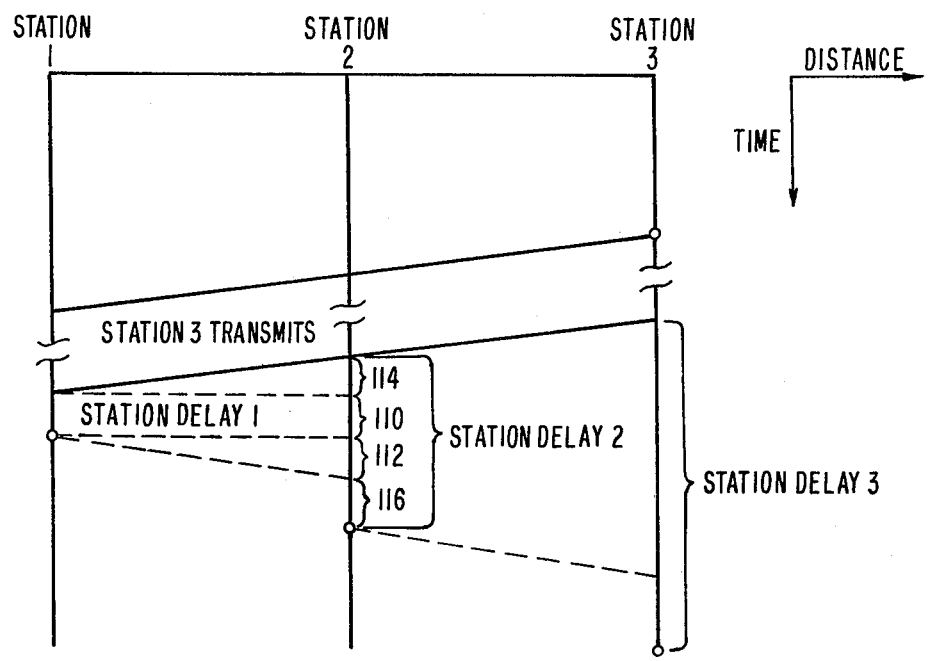
FIG. 6 depicts a graphic representation of a station delay.

The period of time which comprises a station delay is a function of the network topology. FIG. 6 depicts a graphic representation of the station delays in a three-station network. The station delay for station 2 is equal to the station delay 110 for the predecessor, plus the worst case amount of time 112 it takes the station to detect a transmission from its predecessor, plus the worst case difference in time 114 between when a station detects silence and when its predecessor detects silence, plus some short time 116 for hardware timing uncertainties. The station delay for the other two stations is calculated in the same manner. In simple linear networks this reduces to the following equation:

station delay $(n)$ = station delay $(n-1) + 2 \times [d_{n-1,n} \div p] + \Delta$ where:

$d_{n-1,n}$ is the distance from station n−1 to station n
p is the propagation velocity of the signal
Δ is the hardware timing uncertainty.

Delta, Δ, is the magnitude of the timing uncertainty in each station. The following factors each contribute to the value of delta:

(1) Worst case time between the presence of a signal on the bus and the ability of the station to detect that signal;
(2) Maximum difference in time in the ability between any two stations to detect silence;
(3) Logic delays in the receiver logic, bus access logic, and transmitter logic;
(4) One period of the bus access clock;
(5) One period of the modem clock;
(6) Extra time to increase the number of wait delay cycles before the crystal frequency differences between the stations cause collisions.

Figure 7:
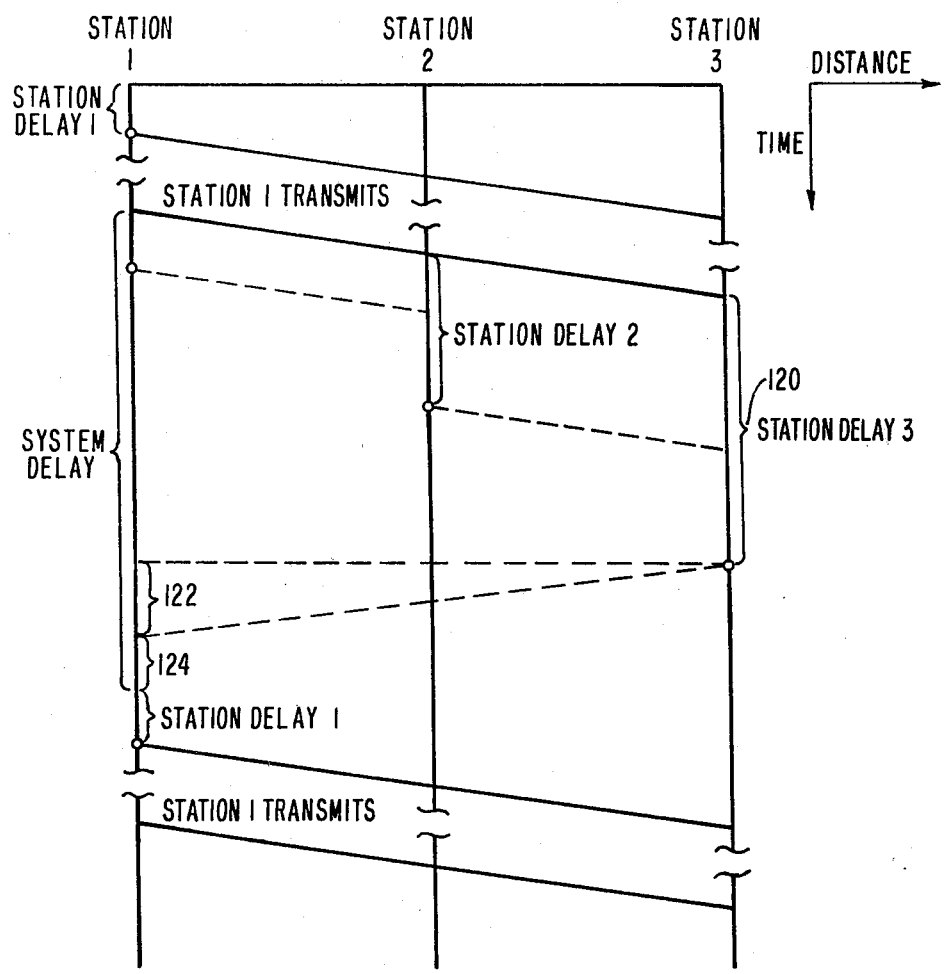
FIG. 7 depicts a graphic representation of a system delay.

As previously defined, the system delay is the amount of time required for all stations to know that all stations have allowed their time window to pass. FIG. 7 depicts a graphic representation of a system delay for a three-station network. The system delay for any serial communication network is equal to the worst case station delay 120, plus the worst case propagation delay 122 between any two stations, plus some small time factor 124 for logic timing uncertainties. In a simple linear network comprised of n stations, the system delay reduces to the following equation:

$$\text{system delay} = \text{station delay}(n) + [d_{1,n} \div p] + \Delta$$

where:
station delay (n) is the longest station delay
$d_{1,n}$ is the maximum length of the network
Δ is the hardware timing uncertainty necessary to insure no collisions will occur.

Figure 8:
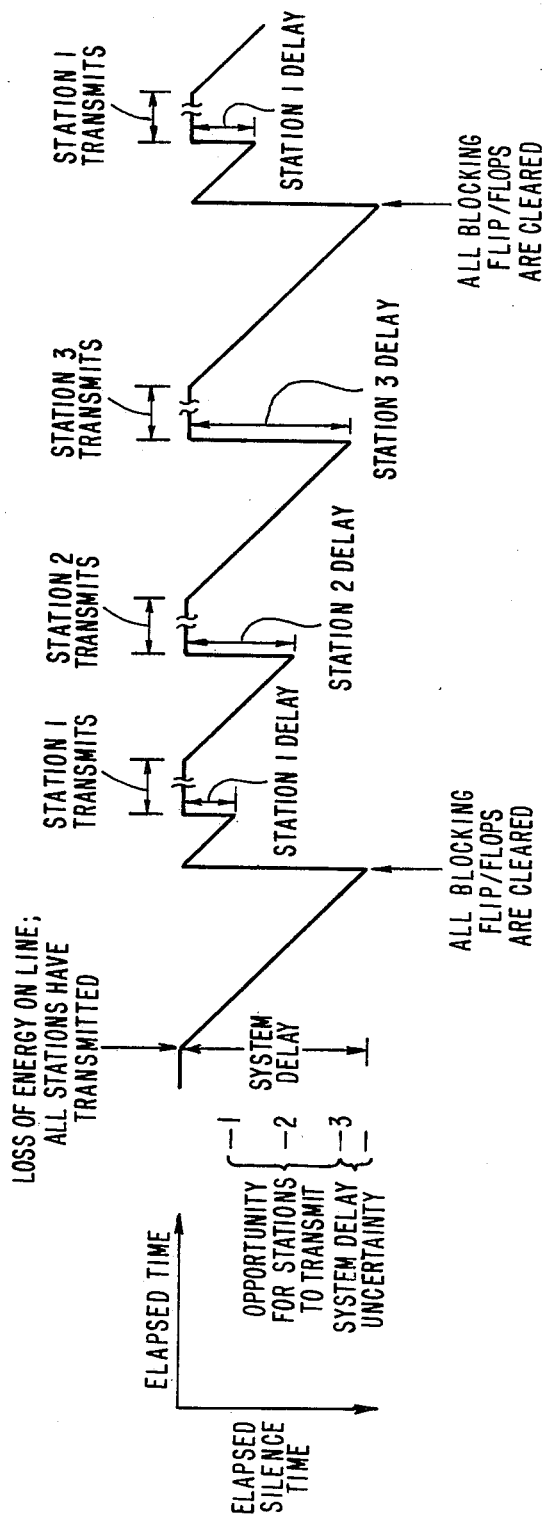
FIG. 8 depicts a graphic interaction among station delays, system delays and blocking flip-flops for three stations.

FIG. 8 depicts a graphic interaction between station delays, system delays and blocking flip-flops for a three-station network. In this example, it is assumed that there is no cable distance between the stations. Hence, the time it takes for any station to detect the transmission of any other given station is assumed to be negligible and the system may be displayed on a single time line. This example makes use of a Cartesian coordinate system in which the abscissa is elapsed time and the ordinate is time during which the serial bus is silent. At the start of this example station 1 has two messages to transmit and stations 2 and 3 have one message each to transmit. As time proceeds each station successively transmits one message upon expiration of its station delay. When the blocking flip-flops are cleared after expiration of the system delay, station 1 is permitted to transmit its second message.

Figure 9:
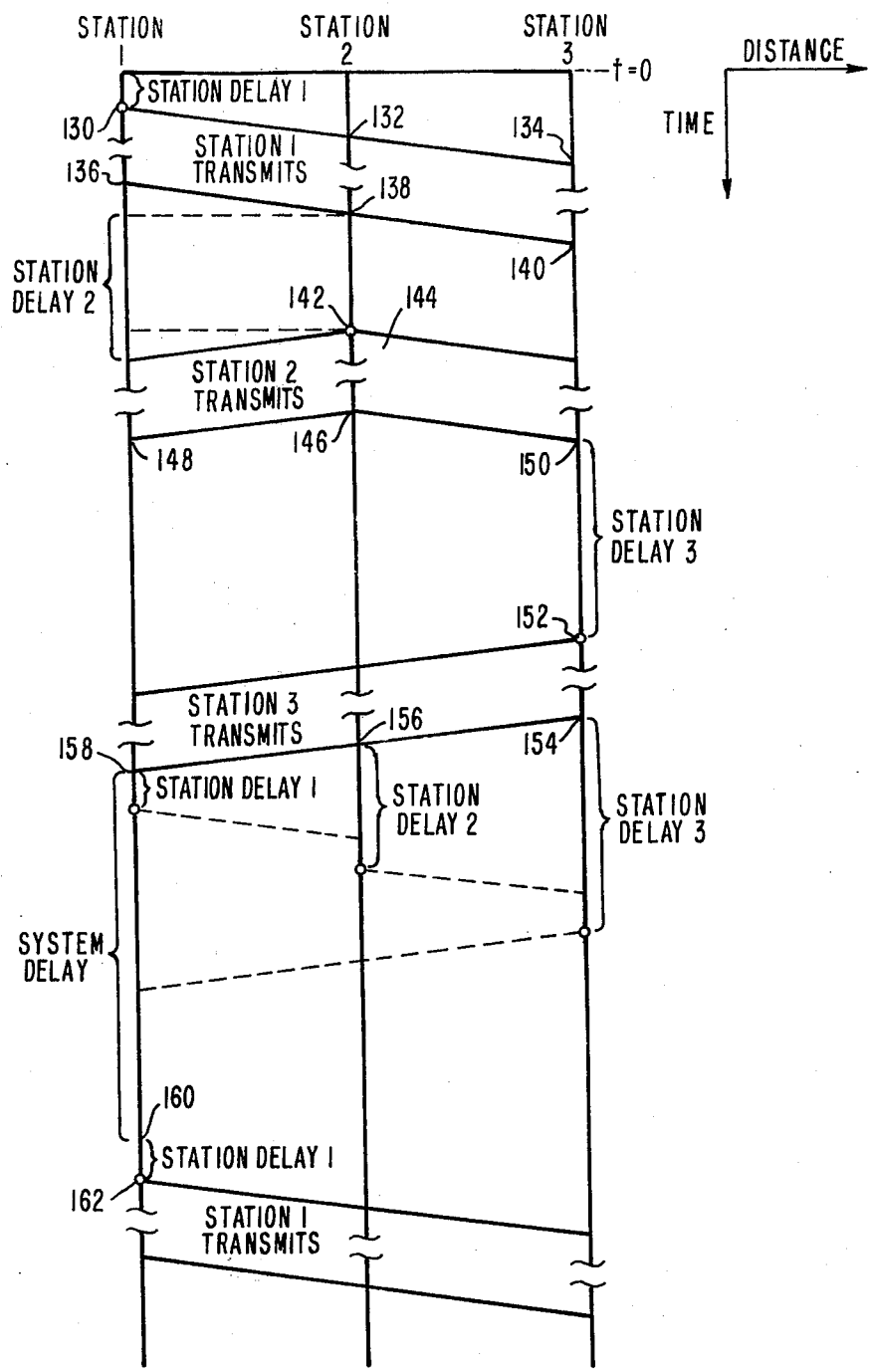
FIG. 9 depicts a graphic representation of a communication network comprised of three stations separated by finite cablings.

FIG. 9 depicts a graphic representation of a communications network comprised of three stations separated by finite lengths of cable. Because of the cable propagation delays, each of the stations is depicted on a different time line. As in the previous example, station 1 has two messages to transmit while stations 2 and 3 each have one message to transmit.

At time, t=0, the station delay and system delay for each station are reset and all blocking flip-flops are cleared. Station delay 1 is the first to expire and station 1 thereafter transmits 130 its first message. After a period of time due to cable propagation delay, station 2 detects 132 the transmission of station 1 and disables its station delay timer. After another period of time, again due to propagation delay, station 3 does the same 134.

After station 1 completes its first transmission, each of the three stations successively start 136, 138, 140 their station delay and system delay timers upon detection of silence on the serial bus. Station delay 1 is again the first to expire, but transmission by station 1 of its second message is prevented by its blocking flip-flop, which was set upon its first transmission. Station delay 2 is the next to expire 142, thereby enabling station 2 to initiate 144 its transmission. Upon detection 146, 148, 150 of the end of this transmission, the station delay and system delay of each station so detecting is again reset. Because transmission by stations 1 and 2 is inhibited by the setting of their blocking flip-flops, station 3 is enabled to transmit upon expiration 152 of its station delay.

The timers of the three stations begin again 154, 156, 158 when each successively detects silence on the serial bus. This time, however, transmission of the all three stations is inhibited by their blocking flip-flops and the system delay timers expire 160, resetting all station delay and system delay timers. The state of the network is now the same as it was at time, t=0. Station 1 transmits its second message upon expiration 162 of its station delay.

The scheme disclosed described permits either a fully prioritized system, when the blocking flip-flop of each station is disabled, or a fully democratic system, when the blocking flip-flop of each station is active. A mixture of democratic and prioritized stations can also be implemented. Those stations which require priority access to the serial bus would have their blocking flip-flops disabled, while the democratic stations would have their blocking flip-flops enabled.

The repetitive cycling of the bus arbitration process permits a unique flexibility in ordering the priority of stations in the network. This is accomplished by structuring the stations in several levels according to the priority desired. Stations in the first level all have a normal system delay. Stations in the second level have a system delay which is longer than that of the first level. Thus, stations in second level are permitted to transmit only if no station in the first level is prepared to transmit. This scheme can be extended to fashion multiple levels of priority to suit the characteristics of any network.

This invention presents a novel means for determining bus access, designed to prevent collisions among multiple stations transmitting on a single serial bus. During periods of activity the station delay and system delay timers of each station are being synchronized relative to one another each time a message is transmitted. Problems may arise, however, during periods of inactivity due to minor differences in the crystal clock frequency of each station. Over a period of long inactivity, these minor differences will eventually create a potential for collision. Fortunately, this is likely to occur during periods of low activity and a retransmission can be made. Transmission again synchronizes the clocks of each station and the chance of further collisions is greatly reduced.

What is claimed is:
1. In a digital communication system, a serial data communications network comprising:
   a plurality of sections;
   a serial data communications bus to which each of said stations is interfaced and through which each of said stations communicates to every other of said stations; and a plurality of circuit means, each in communication with one of said stations, for controlling orderly and collision-free access by said station to said serial bus for transmission thereon, each circuit means comprising:

first means for monitoring said bus for transmission inactivity over a preassigned first time period which is substantially common to all of the stations of said plurality, said first means including means for reinitializing its monitoring time upon detection of bus transmission activity within said first time period and for repeating monitoring of said bus over another first time period upon detection of its transmission inactivity throughout a first time period, said first means further including means for generating a first signal upon initiation of each repeat of a monitoring operation;

second means for monitoring said bus for transmission inactivity over a preassigned second time period, each circuit means corresponding to a station of said plurality being preassigned a unique second time period, said second means including means for reinitializing its monitoring time upon detection of bus transmission activity within said second time period and for generating a second signal upon detection of transmission inactivity throughout said second time period, said second means further including means for repeating monitoring said bus over another second time period concurrent with said repeat of monitoring operation of said first means;

means governed by said second signal to conditionally generate a third signal to permit said corresponding station exclusive transmission access to said bus, whereby collision-free access by each corresponding station to said bus is achieved;

means for enabling said generating means to generate said third signal in accordance with said first signal generation; and means for disabling said generating means to prevent generation of said third signal upon transmission activity of said corresponding station and for maintaining disablement thereof after said transmission until enabled by said enabling means, whereby an orderly access to said bus by each corresponding station is achieved.

2. An apparatus according to claim 1 including a means for assigning a station delay to said station, said assigning means comprising a selector switch means and a down counter means in electrical communication therewith, said down counter means being preloadable through said selector switch means with a predetermined count which defines the system delay.

3. An apparatus according to claim 1 including a means for assigning a common system delay to said station, said assigning means comprising a selector switch means and a down counter means in electrical communication therewith, said down counter means being preloadable through said selector switch means with a predetermined count which defines the system delay.

4. The network in accordance with claim 1 wherein said generating means includes a digital gate governed by a gating signal and the second signal to effect the third signal when the second signal is generated and the gating signal is in an enabling state, and to prevent the third signal generation when the second signal is generated and the gating signal is in a disabling state; and wherein the enabling and disabling means, in combination, include:

a flip-flop circuit responsive logically to the first signal to set said gating signal in its enabling state and responsive to transmission activity of the corresponding station to set said gating signal in its disabling state.

5. A method for providing orderly and collision-free access by a plurality of stations to a common serial data communications bus in a digital communication system wherein each of said stations is assigned a discrete time window during which transmission may be initiated, said method comprising:

monitoring said communication bus for inactivity by each station in accordance with a unique station delay preassigned correspondingly to each of said stations, said preassigned station delay defining a period of time, from an initial monitoring time, during which said station corresponding thereto must detect continuous silence on said communication bus, monitoring said communication bus for inactivity by each station in accordance with a common system delay preassigned to all of said stations, said common system delay defining a period of time, from an initial monitoring time, necessary for all of said stations to have the opportunity to detect continuous silence on said bus through their respective station delays without initiating a transmission, enabling each of said stations to initiate a collision-free transmission on said serial bus upon occurrence of their respective time windows which comprise discrete points in time occurring upon expiration of their respective preassigned station delays, resetting said station and system delays to said initial monitoring time upon detection of a transmission on said serial bus and upon expiration of said common system delay, and disabling a station from initiating transmission on said serial bus upon expiration of a transmission thereof until such time as said common system delay expires, whereby an orderly access to said bus by each of said stations is achieved.

6. A method according to claim 5 including the step of arranging the stations in two or more levels of priority by assigning a common system delay to said stations comprising each level of priority so that no one of said stations comprising any given level of priority may issue a transmission unless all of said stations comprising levels of priority having a shorter system delay allow their time windows to pass.

* * * * *